United States Patent
Sloane et al.

(10) Patent No.: US 11,907,268 B2
(45) Date of Patent: *Feb. 20, 2024

(54) SYSTEM FOR IDENTIFICATION OF OBFUSCATED ELECTRONIC DATA THROUGH PLACEHOLDER INDICATORS

(71) Applicant: BANK OF AMERICA CORPORATION, Charlotte, NC (US)

(72) Inventors: Brandon Sloane, Indian Land, SC (US); Jinyoung Nathan Kim, Charlotte, NC (US); Adriana Tache, Falls Church, VA (US); Charles Edward Dudley, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 229 days.

This patent is subject to a terminal disclaimer.

(21) Appl. No.: 17/172,994

(22) Filed: Feb. 10, 2021

(65) Prior Publication Data

US 2022/0253464 A1    Aug. 11, 2022

(51) Int. Cl.
G06F 16/00        (2019.01)
G06F 21/00        (2013.01)
(Continued)

(52) U.S. Cl.
CPC ........ *G06F 16/287* (2019.01); *G06F 16/1805* (2019.01); *G06F 16/213* (2019.01);
(Continued)

(58) Field of Classification Search
CPC .. G06F 16/287; G06F 16/22; G06F 16/24556; G06F 16/2255; G06F 16/27;
(Continued)

(56) References Cited

U.S. PATENT DOCUMENTS 8,001,607 B2    8/2011    Stull et al.
8,812,524 B2    8/2014    Chen et al.
(Continued)

FOREIGN PATENT DOCUMENTS

WO    WO2001001260 A2  *  1/2001
WO    WO2009139650 A1  *  11/2009
WO    WO2020165756 A1  *  8/2020

OTHER PUBLICATIONS

Christian Pilato et al., "TAO: Techniques for Algorithm-Level Obfuscation during High-Level Synthesis", 2018 55th ACM/ESDA/IEEE Design Automation Conference (DAC), Jun. 2018, pp. 1-6.*

(Continued)

*Primary Examiner* — Srirama Channavajjala
(74) *Attorney, Agent, or Firm* — Moore & Van Allen PLLC; Anup Shrinivasan Lyer

(57) ABSTRACT

Systems, computer program products, and methods are described herein for identification of obfuscated electronic data through placeholder indicators. The present invention is configured to electronically receive, from a computing device of a user, a request to obfuscate one or more data artifacts stored on a first database; retrieve, from a data obfuscation repository, one or more data obfuscation algorithms; implement the one or more data obfuscation algorithms on the one or more data artifacts; generate one or more placeholder indicators identifying the one or more data obfuscation algorithms implemented on the one or more data artifacts; create one or more data fields corresponding to the one or more masked data artifacts on the first database; store the one or more placeholder indicators in the one or more data fields; and update the first database with the one or more masked data artifacts and the one or more placeholder indicators.

18 Claims, 4 Drawing Sheets

(51) Int. Cl.
  *G06F 16/28* (2019.01)
  *G06F 16/22* (2019.01)
  *G06F 21/62* (2013.01)
  *G06F 21/31* (2013.01)
  *G06F 16/2455* (2019.01)
  *G06F 16/18* (2019.01)
  *G06F 16/21* (2019.01)
  *G06F 16/23* (2019.01)

(52) U.S. Cl.
  CPC ............ *G06F 16/22* (2019.01); *G06F 16/235* (2019.01); *G06F 16/24556* (2019.01); *G06F 21/31* (2013.01); *G06F 21/6218* (2013.01); *G06F 21/6227* (2013.01)

(58) Field of Classification Search
  CPC .. G06F 21/31; G06F 21/6218; G06F 21/6227; G06F 21/6254; G06F 21/6245; G06F 21/1602; G06F 16/1805; G06F 16/213; G06F 16/235; G06K 9/6215; G06K 9/6276
  See application file for complete search history.

(56) References Cited

U.S. PATENT DOCUMENTS

| | | | |
|---|---|---|---|
| 8,949,209 B2 | 2/2015 | Khin et al. | |
| 8,959,654 B2 | 2/2015 | Avrahami et al. | |
| 9,043,929 B2 | 5/2015 | Avrahami et al. | |
| 9,223,995 B1 | 12/2015 | Lavinio | |
| 9,251,339 B2 | 2/2016 | Bullis et al. | |
| 9,298,878 B2 | 3/2016 | Guirguis et al. | |
| 9,646,143 B2 | 5/2017 | Lavinio | |
| 9,716,692 B2 | 7/2017 | Cismas et al. | |
| 9,753,931 B2 | 9/2017 | Burshteyn | |
| 9,946,895 B1 | 4/2018 | Kruse et al. | |
| 10,037,330 B1 | 7/2018 | Burshteyn | |
| 10,102,398 B2 | 10/2018 | Neergaard | |
| 10,216,958 B2 | 2/2019 | Avrahami et al. | |
| 10,289,816 B1* | 5/2019 | Malassenet | G06F 21/14 |
| 10,289,868 B2 | 5/2019 | Jagadish et al. | |
| 10,298,545 B2 | 5/2019 | Boivie et al. | |
| 10,860,732 B2 | 12/2020 | Guirguis et al. | |
| 10,929,556 B1 | 2/2021 | Kurian | |
| 11,238,138 B1* | 2/2022 | Ancheta | G06F 21/14 |
| 2006/0195703 A1* | 8/2006 | Jakubowski | G06F 21/14 713/190 |
| 2011/0270837 A1 | 11/2011 | Raj et al. | |
| 2012/0079281 A1* | 3/2012 | Lowenstein | H04L 9/0618 713/189 |
| 2012/0272329 A1 | 10/2012 | Grammer et al. | |
| 2013/0054650 A1 | 2/2013 | O'Byrne | |
| 2013/0104239 A1* | 4/2013 | McLachlan | G06F 7/588 726/26 |
| 2014/0019467 A1* | 1/2014 | Itoh | G06F 21/6254 707/757 |
| 2014/0188514 A1 | 7/2014 | Balignasay et al. | |
| 2015/0074392 A1 | 3/2015 | Boivie | |
| 2015/0098564 A1 | 4/2015 | Chamley et al. | |
| 2016/0092871 A1* | 3/2016 | Gordon | G06Q 20/3221 705/44 |
| 2016/0300075 A1 | 10/2016 | Stankiewicz et al. | |
| 2018/0060612 A1* | 3/2018 | Gladwin | G06F 21/85 |
| 2018/0248887 A1* | 8/2018 | Sayed | G06F 21/6245 |
| 2020/0034573 A1* | 1/2020 | Pulkus | G06F 21/755 |
| 2020/0159907 A1* | 5/2020 | Johnson | G06T 5/005 |
| 2020/0265159 A1* | 8/2020 | Schmatz | G06F 21/6245 |
| 2020/0327252 A1* | 10/2020 | Mcfall | G06F 21/78 |
| 2020/0364801 A1 | 11/2020 | Basra | |
| 2021/0150038 A1* | 5/2021 | Valecha | H04L 9/3268 |
| 2021/0174347 A1 | 6/2021 | Rose | |
| 2021/0398128 A1 | 12/2021 | Huber, Jr. | |
| 2022/0075899 A1 | 3/2022 | Richardson | |
| 2022/0229913 A1* | 7/2022 | Mack | G06F 16/24556 |

OTHER PUBLICATIONS

Rajat Subhra Chakraborty et al., "Hardware protection and authentication through netlist level obfuscation", 2008 IEEE/ACM International Conference on Computer-Aided Design, Nov. 2008, pp. 1-4.*

* cited by examiner

SYSTEM FOR IDENTIFICATION OF OBFUSCATED ELECTRONIC DATA THROUGH PLACEHOLDER INDICATORS

FIELD OF THE INVENTION

The present invention embraces a system for identification of obfuscated electronic data through placeholder indicators.

BACKGROUND

Data management is the practice of managing data as a valuable resource to unlock its potential for an entity. Managing data effectively requires having a data strategy and reliable methods to access, integrate, store and secure data for analytics and use. Securing such data typically involves limiting access to sensitive data using sufficient data security and information security practices designed to prevent unauthorized disclosure and access.

As part of the effort to protect sensitive data, there is a need for a system for identification of obfuscated electronic data through placeholder indicators.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for identification of obfuscated electronic data through placeholder indicators is presented. The system comprising: at least one non-transitory storage device; and at least one processing device coupled to the at least one non-transitory storage device, wherein the at least one processing device is configured to: electronically receive, from a computing device of a user, a request to obfuscate one or more data artifacts stored on a first database; retrieve, from a data obfuscation repository, one or more data obfuscation algorithms based on at least receiving the request to obfuscate the one or more data artifacts; implement the one or more data obfuscation algorithms on the one or more data artifacts to generate one or more masked data artifacts; generate one or more placeholder indicators identifying the one or more data obfuscation algorithms implemented on the one or more data artifacts; create one or more data fields corresponding to the one or more masked data artifacts on the first database; store the one or more placeholder indicators in the one or more data fields; and update the first database with the one or more masked data artifacts and the one or more placeholder indicators.

In some embodiments, the at least one processing device is further configured to: electronically receive, from the computing device of the user, a request to access the first database; transmit control signals configured to cause the computing device associated with the user, an authentication request in response to receiving the request to access the first database; receive, from the computing device of the user, an authentication response in response to the authentication request; validate the authentication response received from the user; and authorize the user to access the first database based on at least validating the authentication response.

In some embodiments, the at least one processing device is further configured to: receive, from the computing device of the user, the authentication response in response to the authentication request, wherein the authentication response comprises one or more authentication credentials associated with the user.

In some embodiments, the at least one processing device is further configured to: scan the first database for one or more instances of placeholder indicators; identify the one or more placeholder indicators based on at least scanning the first database; and determine that the one or more data artifacts in the first database are masked based on at least identifying the one or more placeholder indicators.

In some embodiments, the at least one processing device is further configured to: initiate a data deobfuscation engine on the first database based on at least determining that the one or more data artifacts in the first database are masked, wherein initiating further comprises: identifying one or more data deobfuscation algorithms corresponding to the one or more placeholder indicators; identifying the one or more masked data artifacts corresponding to the one or more placeholder indicators; implementing the one or more data deobfuscation algorithms on the one or more masked data artifacts corresponding to the one or more placeholder indicators; and unmasking the one or more masked data artifacts based on at least implementing the one or more data deobfuscation algorithms.

In some embodiments, the at least one processing device is further configured to: transmit control signals configured to cause the computing device of the user to display the one or more data artifacts in response to unmasking the one or more masked data artifacts.

In some embodiments, the at least one processing device is further configured to: determine one or more authorization requirements associated with the one or more masked data artifacts; determine an authentication level of the user based on at least the one or more authentication credentials; determine that the authentication level of the user meets the one or more authorization requirements associated with the one or more masked data artifacts; and implement the one or more data deobfuscation algorithms on the one or more masked data artifacts based on at least determining that the authentication level of the user meets the one or more authorization requirements associated with the one or more masked data artifacts.

In some embodiments, the at least one processing device is further configured to: append the one or more placeholder indicators to the one or more masked data artifacts identifying the one or more data obfuscation algorithms used to mask the one or more data artifacts.

In another aspect, a computer program product for identification of obfuscated electronic data through placeholder indicators is presented. The computer program product comprising a non-transitory computer-readable medium comprising code causing a first apparatus to: electronically receive, from a computing device of a user, a request to obfuscate one or more data artifacts stored on a first database; retrieve, from a data obfuscation repository, one or more data obfuscation algorithms based on at least receiving the request to obfuscate the one or more data artifacts; implement the one or more data obfuscation algorithms on the one or more data artifacts to generate one or more masked data artifacts; generate one or more placeholder indicators identifying the one or more data obfuscation algorithms implemented on the one or more data artifacts;

create one or more data fields corresponding to the one or more masked data artifacts on the first database; store the one or more placeholder indicators in the one or more data fields; and update the first database with the one or more masked data artifacts and the one or more placeholder indicators.

In yet another aspect, a method for identification of obfuscated electronic data through placeholder indicators is presented. The method comprising: electronically receiving, from a computing device of a user, a request to obfuscate one or more data artifacts stored on a first database; retrieving, from a data obfuscation repository, one or more data obfuscation algorithms based on at least receiving the request to obfuscate the one or more data artifacts; implementing the one or more data obfuscation algorithms on the one or more data artifacts to generate one or more masked data artifacts; generating one or more placeholder indicators identifying the one or more data obfuscation algorithms implemented on the one or more data artifacts; creating one or more data fields corresponding to the one or more masked data artifacts on the first database; storing the one or more placeholder indicators in the one or more data fields; and updating the first database with the one or more masked data artifacts and the one or more placeholder indicators.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
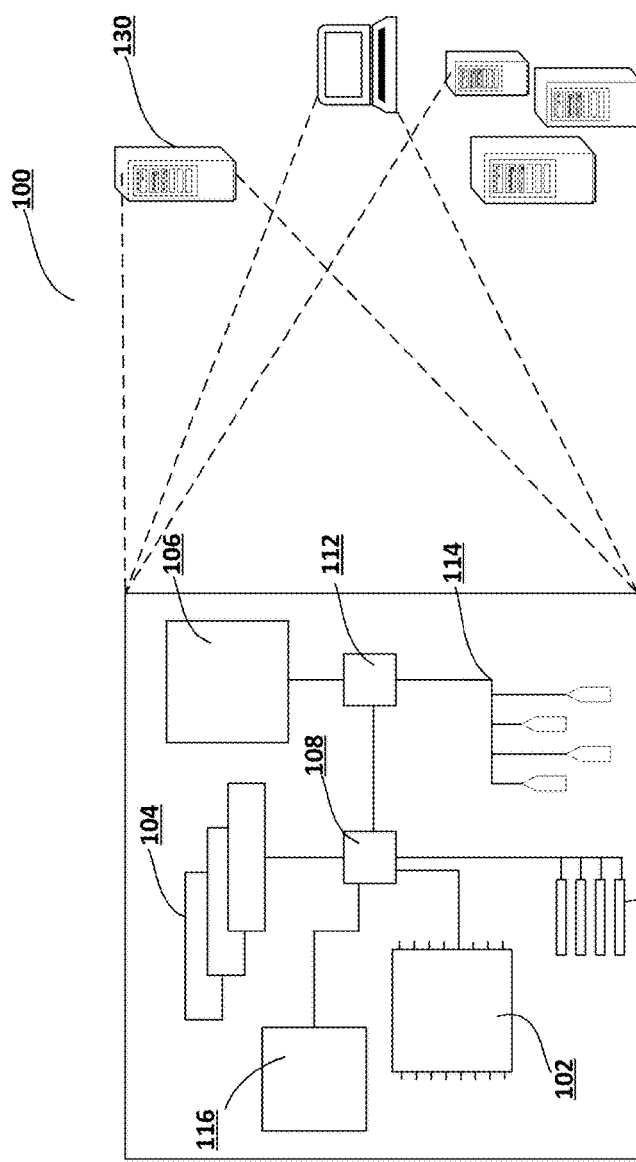
Figure 1:
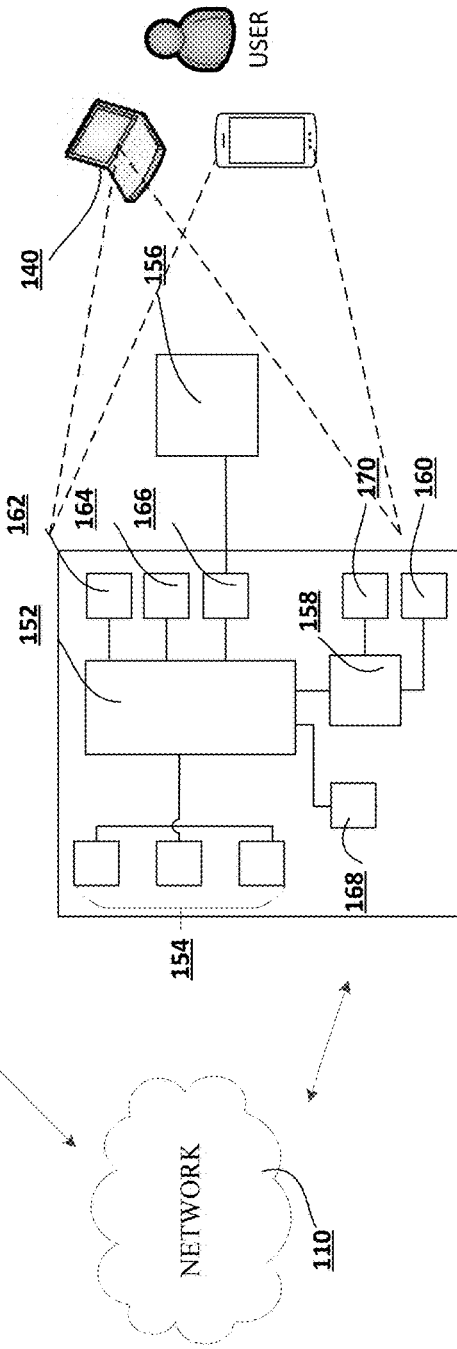
Figure 2:
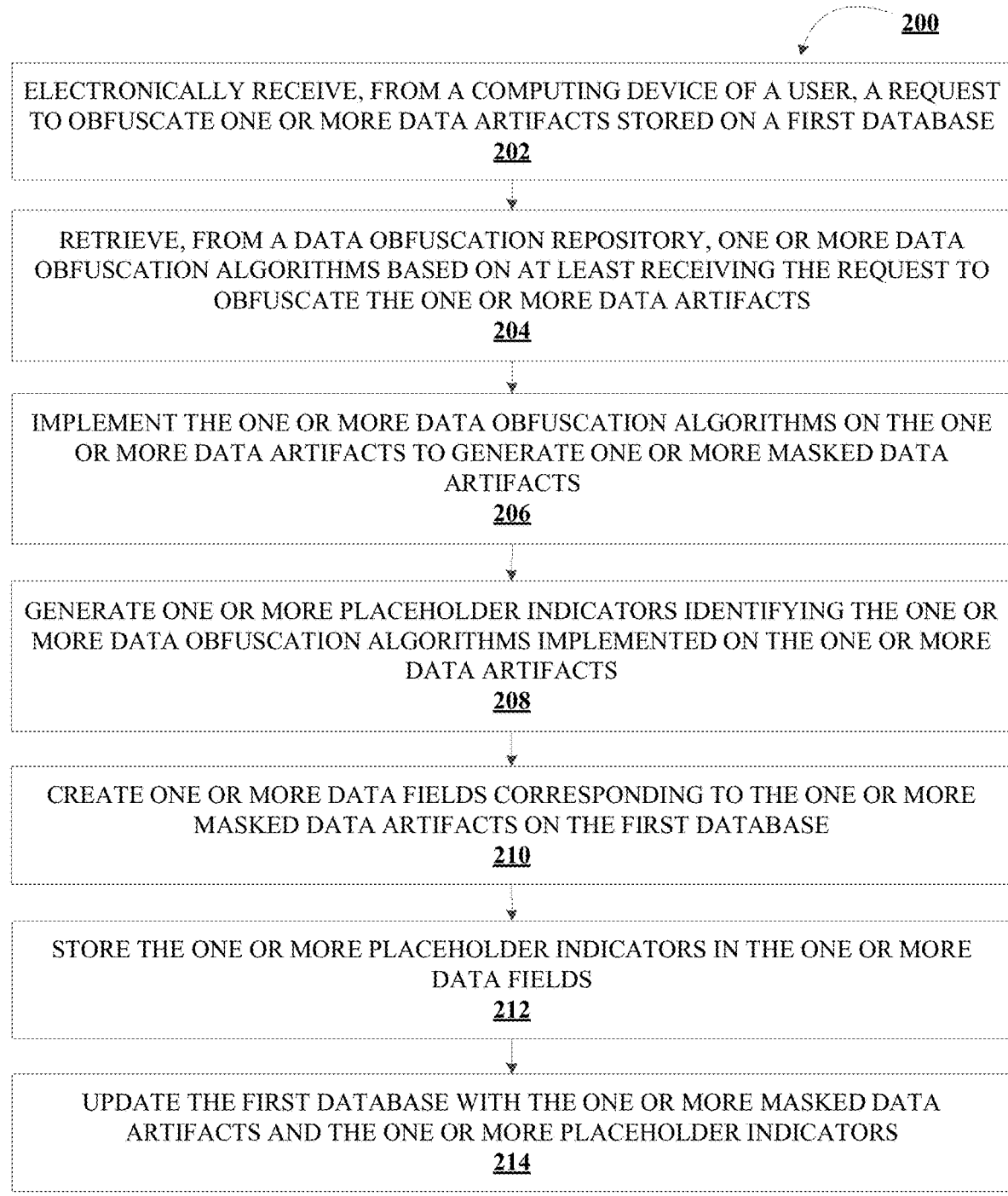
Figure 3:
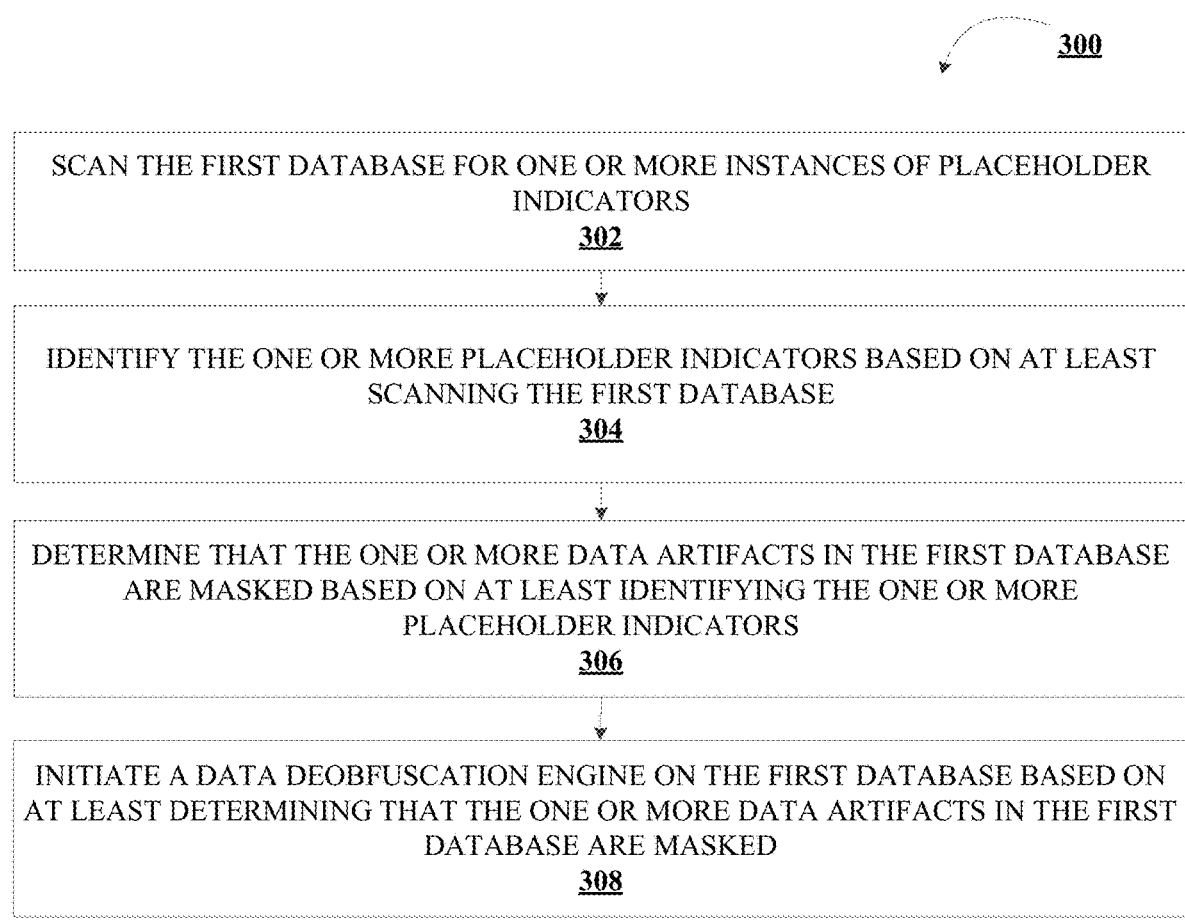
Figure 4:
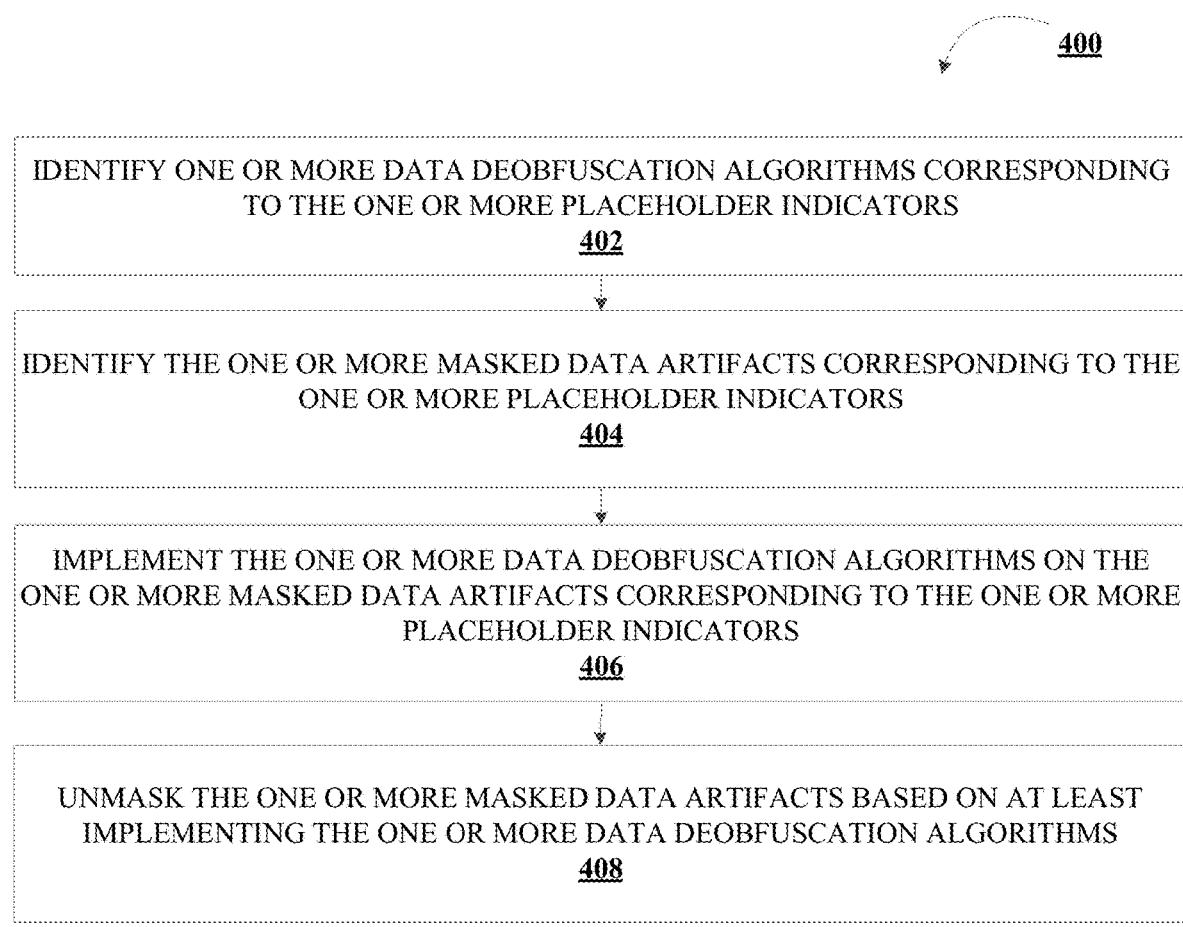

Having thus described embodiments of the invention in general terms, reference will now be made the accompanying drawings, wherein:

FIG. 1 illustrates technical components of a system for identification of obfuscated electronic data through placeholder indicators, in accordance with an embodiment of the invention;

FIG. 2 illustrates a process flow for generating placeholder indicators for obfuscated electronic data, in accordance with an embodiment of the invention;

FIG. 3 illustrates a process flow for identification of obfuscated electronic data through placeholder indicators, in accordance with an embodiment of the invention; and FIG. 4 illustrates a process flow for implementing data deobfuscation algorithms based on identified placeholder indicators, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "data obfuscation" or "data masking" may refer to the process of hiding or obscuring original data artifacts with modified content (characters or other data artifacts) to ensure privacy. In some embodiments, data masking algorithmically substitutes realistic but false data artifacts for the original data artifacts. The resulting masked data artifacts will continue to meet the requirements of a system designed to test or still work with the masked results. In embodiments contemplated herein, data obfuscation algorithms used to mask the data artifacts are dynamic and reversible, i.e., the data obfuscation algorithms are capable of transforming the data artifacts while preserving the integrity of the data. For example, shuffling-based data obfuscation algorithms allow for randomly switching values within a column, substitution-based data obfuscation algorithms allow for a given value to be mapped to an equivalent value in a secure lookup table. The legitimate data artifacts remain in the data repository and are accessible when authorized by the system described herein. During deobfuscation or unmasking process, the original data is shuffled or substituted (deobfuscated) in real-time on-demand to make the contents unmasked. Only an authorized user may be able to see the legitimate data artifacts.

FIG. 1 presents an exemplary block diagram of the system environment for identification of obfuscated electronic data through placeholder indicators 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA 2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for generating placeholder indicators for obfuscated electronic data 200, in accordance with an embodiment of the invention. As shown in block 202, the process flow includes electronically receiving, from a computing device of a user, a request to obfuscate one or more data artifacts stored on a first database. In one aspect, a data artifact may refer to a data record and its associated indexes, metadata, database boot structures, and so forth.

Next, as shown in block 204, the process flow includes retrieving, from a data obfuscation repository, one or more data obfuscation algorithms based on at least receiving the request to obfuscate the one or more data artifacts. In some embodiments, the system may be configured to determine whether the user is authorized to request the obfuscation of the one or more data artifacts stored in the first database. In this regard, the system may be configured to request, and in response, receive authentication credentials from the user. By validating the authentication credentials received from the user, the system may be configured to determine whether the user is authorized to request the obfuscation of the one or more data artifacts. In response to determining that the user is authorized, the system may be configured to initiate the implementation of data obfuscation algorithms on the one or more data artifacts.

Next, as shown in block 206, the process flow includes implementing the one or more data obfuscation algorithms on the one or more data artifacts to generate one or more masked data artifacts. In some embodiments, each data artifact may be associated with a predetermined data type. Each data type may be associated with an exposure level (e.g., low, medium, high). In some embodiments, the exposure level determines the type and method of data obfuscation that is to be implemented on the data artifact. In one example, data artifacts with a high exposure level may require a more computationally complex obfuscation algorithm compared to data artifacts with moderate exposure level or low exposure level. In another example, data artifacts with low exposure level may require fewer iterative implementations of the obfuscation algorithm compared to data artifacts with moderate exposure level or high exposure level. In yet another example, data artifacts with moderate exposure level may require a moderately computationally complex obfuscation algorithm with multiple iterative implementations while data artifacts with high exposure level may require a moderately computationally complex obfuscation algorithm with greater number of iterative implementations.

In some embodiments, the system may be configured to retrieve, from a data obfuscation repository, one or more data obfuscation algorithms based on at least the one or more data types. In some embodiments, the data obfuscation repository may refer to a database configured to store a plurality of data obfuscation (and associated deobfuscation) algorithms capable of being retrieved by the data obfuscation engine. Based on the data type and its associated exposure level, the system may be configured to retrieve data obfuscation algorithms from the data obfuscation repository for implementation. By implementing the one or more data obfuscation algorithms, the system may be configured to obfuscate/mask the one or more data artifacts to generate one or more masked data artifacts. In some embodiments, the first database may contain data artifacts of different data types with different exposure levels. In such cases, the resulting obfuscated first database may include data artifacts that are masked using different obfuscation algorithms chosen based on individual data types and associated exposure levels.

Next, as shown in block 208, the process flow includes generating one or more placeholder indicators identifying the one or more data obfuscation algorithms implemented on the one or more data artifacts. In some embodiments, a placeholder indicator may be a faux record generated to indicate and indicate that a data record is masked and also identify the specific data obfuscation algorithm implemented to mask the data record. As each data obfuscation algorithm is associated with a corresponding data deobfuscation algorithm to reverse the effect of data obfuscation on the data artifact, i.e., unmask the masked data artifact, the placeholder indicator may be used to identify the data obfuscation algorithm used to mask the data artifact so that a corresponding data deobfuscation algorithm may be used to unmask the masked data artifact. In one aspect, the one or more placeholder indicators may be formatted to resemble the one or more data artifacts. By formatting the placeholder indicators to resemble the data artifacts, an unauthorized user who gains access to the first database may not be aware of the presence of the placeholder indicators but think that they are data artifacts. However, the legitimate data artifacts are masked, and the placeholder indicators are not legitimate data artifacts.

Next, as shown in block 210, the process flow includes creating one or more data fields corresponding to the one or more masked data artifacts on the first database. In some embodiments, depending on the configuration of the first database, the system may be configured to create fields and/or records capable of storing data values corresponding to the data artifacts. Next, as shown in block 212, the process flow includes storing the one or more placeholder indicators in the one or more data fields. By storing the placeholder indicators in the data fields, the system may be configured to associate the placeholder indicator with the data artifact. In one example, the placeholder indicator may be configured to include a pointer that associates each placeholder indicator with a data artifact. In another example, the placeholder indicator may include data values that indicate which data artifact it corresponds to.

In some embodiments, the system may be configured to append the one or more placeholder indicators to the one or more masked data artifacts identifying the one or more data obfuscation algorithms used to mask the one or more data artifacts. By appending the placeholder indicators directly to the masked data artifacts, the system may be configured to indicate the identity of the obfuscation algorithm used to mask the data artifact at the data artifact level. In some other embodiments, the placeholder indicators may be identifiable at the first database level to indicate that at least a portion of the data artifacts stored therein are masked.

Next, as shown in block 214, the process flow includes updating the first database with the one or more masked data artifacts and the one or more placeholder indicators. For purposes of the invention, the updated first database that takes the place of the first database may be referred to as the obfuscated first database.

In some embodiments, when a user wishes to access the obfuscated first database, the system may be configured to determine whether the user has the authorization level to access the obfuscated data artifacts stored therein. Based on the authorization level of the user, the system may be configured to unmask the data artifacts. To determine the authorization level of the user attempting to access the first database, the system may be configured to transmit control signals configured to cause the computing device associated with the user, an authentication request in response to receiving the request to access the obfuscated first database. In response, the system may be configured to receive, from the computing device of the user, an authentication response in response to the authentication request. In some embodiments, the authentication response may include one or more authentication credentials associated with the user. In response to receiving the authentication credentials, the system may be configured to validate the authentication response received from the user. Once validated, the system may be configured to authorize the user to access the obfuscated first database based on at least validating the authentication response.

FIG. 3 illustrates a process flow for identification of obfuscated electronic data through placeholder indicators 300, in accordance with an embodiment of the invention. As shown in block 302, the process flow includes scanning the first database for one or more instances of placeholder indicators. In some embodiments, in response to authorizing the user to access the obfuscated first database, the system may be configured to initiate the deobfuscation engine to unmask the masked data artifacts. In this regard, the system may be configured to first determine the obfuscation algorithm(s) used to masked specific data artifacts. To achieve this, the system may be configured to scan the first database for instances of placeholder indicators. In this regard, the system may be configured to initiate a table scan, an index scan, an index seek, or any applicable database scanning method to identify instances of placeholder indicators.

Next, as shown in block 304, the process flow includes identifying the one or more placeholder indicators based on at least scanning the first database. In some embodiments, the placeholder indicators may include one or more data identifiers that identifies, i.e., labels the identity of, either a unique data object or a unique class of objects. In one aspect, an object or class may be an idea, physical countable object (or class thereof), or physical noncountable substance (or class thereof). In some embodiments, the data identifiers associated with the placeholder indicators may be words, numbers, letters, or symbols that follow an encoding system (wherein letters, digits, words, or symbols stand for (represent) ideas or longer names) or they may be arbitrary, i.e., given meaning by the backend system during the obfuscation process. For example, the identifier associated with the placeholder indicator may be a pointer that associates each placeholder indicator with a data artifact. Accordingly, the system may be configured to identify the placeholder indicators based on at least the associated identifiers.

Next, as shown in block 306, the process flow includes determining that the one or more data artifacts in the first database are masked based on at least identifying the one or more placeholder indicators. By identifying the data fields with the placeholder indicators in the first database, the system may be configured to determine that the one or more data artifacts corresponding to the one or more placeholder indicators are indeed masked data artifacts. In addition, based on identifying the placeholder indicators, the system may be configured to identify specific obfuscation algorithms that are used to mask the corresponding data artifacts. In cases where the placeholder indicators are identified as being appended to the masked data artifacts, the system may be configured to determine that the specific masked data artifact is indeed masked from the data values associated with the masked data artifact. In addition, based on identifying the placeholder indicators, the system may be configured to identify the specific obfuscation algorithm used to mask the data artifact at the (masked) data artifact level.

Next, as shown in block 306, the process flow includes initiating a data deobfuscation engine on the first database based on at least determining that the one or more data artifacts in the first database are masked. In some embodiments, the system may be configured to initiate the data deobfuscation engine on the obfuscated first database to unmask the masked data artifacts.

FIG. 4 illustrates a process flow for implementing data deobfuscation algorithms based on identified placeholder indicators 400, in accordance with an embodiment of the invention. As shown in block 402, the process flow includes identifying one or more data deobfuscation algorithms corresponding to the one or more placeholder indicators. As described herein, each data obfuscation algorithm used to mask a data artifact may be associated with a corresponding data deobfuscation algorithm to unmask the data artifact. Based on identifying the data obfuscation algorithm from the placeholder indicators, the system may be configured to identify, from the data obfuscation repository, the corresponding data deobfuscation algorithm.

Next, as shown in block 404, the process flow includes identifying the one or more masked data artifacts corresponding to the one or more placeholder indicators.

Next, as shown in block 406, the process flow includes implementing the one or more data deobfuscation algorithms on the one or more masked data artifacts corresponding to the one or more placeholder indicators. In some embodiments, the data deobfuscation algorithms may include software code that may be configured to reverse the effect of the data obfuscation algorithms on the data artifacts, i.e., unmask the data artifact.

Next, as shown in block 408, the process flow includes unmasking the one or more masked data artifacts based on at least implementing the one or more data deobfuscation algorithms.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 12020US1.014033.3957 | To be assigned | SYSTEM FOR IMPLEMENTING DYNAMIC DATA OBFUSCATION USING | Concurrently herewith |

| Docket Number | U.S. patent application Ser. No. | Title | Filed On |
|---|---|---|---|
| 12024US1.014033.3960 | To be assigned | PATTERN RECOGNITION TECHNIQUES SYSTEM FOR ELECTRONIC DATA OBFUSCATION THROUGH ALTERATION OF DATA FORMAT | Concurrently herewith |
| 12025US1.014033.3961 | To be assigned | SYSTEM FOR SECURE OBFUSCATION OF ELECTRONIC DATA WITH DATA FORMAT PRESERVATION | Concurrently herewith |
| 12026US1.014033.3963 | To be assigned | SYSTEM FOR IMPLEMENTING MULTI-DIMENSIONAL DATA OBFUSCATION | Concurrently herewith |

What is claimed is:

1. A system for identification of obfuscated electronic data through placeholder indicators, the system comprising:
at least one non-transitory storage device; and
at least one processing device coupled to the at least one non-transitory storage device, wherein the at least one processing device is configured to:
electronically receive, from a computing device of a user, a request to obfuscate one or more data artifacts stored on a first database;
determine one or more data types associated with the one or more data artifacts, wherein the one or more data types are associated with one or more exposure levels;
retrieve, from a data obfuscation repository, one or more data obfuscation algorithms based on at least the one or more exposure levels, wherein the one or more obfuscation algorithms is associated with one or more computational complexity;
determine that the one or more computational complexity of the one or more obfuscation algorithms does not meet one or more computational complexity requirements of the one or more data artifacts;
determine a number of iterations of implementation required for each of the one or more data obfuscation algorithms such that the one or more computational complexity of the one or more data obfuscation algorithms meets the one or more computational complexity requirements of the one or more data artifacts to generate one or more masked data artifacts;
iteratively implement the one or more data obfuscation algorithms on the one or more data artifacts according to the number of iterations of implementation to obfuscate the one or more data artifacts and generate the one or more masked data artifacts;
generate one or more placeholder indicators identifying the one or more data obfuscation algorithms implemented on the one or more data artifacts, wherein the one or more placeholder indicators a pointer that associates each placeholder indicator with a corresponding data artifact;
create one or more data fields corresponding to the one or more masked data artifacts on the first database;
format the one or more placeholder indicators to resemble the one or more data artifacts such that an unauthorized user who gains access to the first database is unable to distinguish between the one or more data artifacts and the one or more placeholders;
store the one or more placeholder indicators in the one or more data fields, wherein storing further comprises appending the one or more placeholder indicators to the one or more masked data artifacts;
update the first database with the one or more masked data artifacts and the one or more placeholder indicators;
electronically receive, from the computing device of the user, a request to access the first database; and
initiate a data deobfuscation engine on the first database in response to receiving the request, wherein initiating further comprises:
identifying one or more data deobfuscation algorithms corresponding to the one or more placeholder indicators;
identifying the one or more masked data artifacts corresponding to the one or more placeholder indicators;
implementing the one or more data deobfuscation algorithms on the one or more masked data artifacts corresponding to the one or more placeholder indicators; and
unmasking the one or more masked data artifacts based on at least implementing the one or more data deobfuscation algorithms.

2. The system of claim 1, wherein the at least one processing device is further configured to:
transmit control signals configured to cause the computing device associated with the user, an authentication request in response to receiving the request to access the first database;
receive, from the computing device of the user, an authentication response in response to the authentication request;
validate the authentication response received from the user; and
authorize the user to access the first database based on at least validating the authentication response.

3. The system of claim 2, wherein the at least one processing device is further configured to:
receive, from the computing device of the user, the authentication response in response to the authentication request, wherein the authentication response comprises one or more authentication credentials associated with the user.

4. The system of claim 3, wherein the at least one processing device is further configured to:
scan the first database for one or more instances of placeholder indicators;

identify the one or more placeholder indicators based on at least scanning the first database; and determine that the one or more data artifacts in the first database are masked based on at least identifying the one or more placeholder indicators.

5. The system of claim 3, wherein the at least one processing device is further configured to:

determine one or more authorization requirements associated with the one or more masked data artifacts;

determine an authentication level of the user based on at least the one or more authentication credentials;

determine that the authentication level of the user meets the one or more authorization requirements associated with the one or more masked data artifacts; and implement the one or more data deobfuscation algorithms on the one or more masked data artifacts based on at least determining that the authentication level of the user meets the one or more authorization requirements associated with the one or more masked data artifacts.

6. The system of claim 1, wherein the at least one processing device is further configured to:

transmit control signals configured to cause the computing device of the user to display the one or more data artifacts in response to unmasking the one or more masked data artifacts.

7. The system of claim 1, wherein the at least one processing device is further configured to:

append the one or more placeholder indicators to the one or more masked data artifacts identifying the one or more data obfuscation algorithms used to mask the one or more data artifacts.

8. A computer program product for identification of obfuscated electronic data through placeholder indicators, the computer program product comprising a non-transitory computer-readable medium comprising code causing a first apparatus to:

electronically receive, from a computing device of a user, a request to obfuscate one or more data artifacts stored on a first database;

determine one or more data types associated with the one or more data artifacts, wherein the one or more data types are associated with one or more exposure levels;

retrieve, from a data obfuscation repository, one or more data obfuscation algorithms based on at least the one or more exposure levels, wherein the one or more obfuscation algorithms is associated with one or more computational complexity;

determine that the one or more computational complexity of the one or more obfuscation algorithms does not meet one or more computational complexity requirements of the one or more data artifacts;

determine a number of iterations of implementation required for each of the one or more data obfuscation algorithms such that the one or more computational complexity of the one or more data obfuscation algorithms meets the one or more computational complexity requirements of the one or more data artifacts to generate one or more masked data artifacts;

iteratively implement the one or more data obfuscation algorithms on the one or more data artifacts according to the number of iterations of implementation to obfuscate the one or more data artifacts and generate the one or more masked data artifacts;

generate one or more placeholder indicators identifying the one or more data obfuscation algorithms implemented on the one or more data artifacts, wherein the one or more placeholder indicators a pointer that associates each placeholder indicator with a corresponding data artifact;

create one or more data fields corresponding to the one or more masked data artifacts on the first database;

format the one or more placeholder indicators to resemble the one or more data artifacts such that an unauthorized user who gains access to the first database is unable to distinguish between the one or more data artifacts and the one or more placeholders;

store the one or more placeholder indicators in the one or more data fields, wherein storing further comprises appending the one or more placeholder indicators to the one or more masked data artifacts;

update the first database with the one or more masked data artifacts and the one or more placeholder indicators;

electronically receive, from the computing device of the user, a request to access the first database; and initiate a data deobfuscation engine on the first database in response to receiving the request, wherein initiating further comprises:

identifying one or more data deobfuscation algorithms corresponding to the one or more placeholder indicators;

identifying the one or more masked data artifacts corresponding to the one or more placeholder indicators;

implementing the one or more data deobfuscation algorithms on the one or more masked data artifacts corresponding to the one or more placeholder indicators; and unmasking the one or more masked data artifacts based on at least implementing the one or more data deobfuscation algorithms.

9. The computer program product of claim 8, wherein the code further causes the first apparatus to:

transmit control signals configured to cause the computing device associated with the user, an authentication request in response to receiving the request to access the first database;

receive, from the computing device of the user, an authentication response in response to the authentication request;

validate the authentication response received from the user; and authorize the user to access the first database based on at least validating the authentication response.

10. The computer program product of claim 9, wherein the code further causes the first apparatus to receive, from the computing device of the user, the authentication response in response to the authentication request, wherein the authentication response comprises one or more authentication credentials associated with the user.

11. The computer program product of claim 10, wherein the code further causes the first apparatus to:

scan the first database for one or more instances of placeholder indicators;

identify the one or more placeholder indicators based on at least scanning the first database; and determine that the one or more data artifacts in the first database are masked based on at least identifying the one or more placeholder indicators.

12. The computer program product of claim 10, wherein the code further causes the first apparatus to:

determine one or more authorization requirements associated with the one or more masked data artifacts;

determine an authentication level of the user based on at least the one or more authentication credentials;
determine that the authentication level of the user meets the one or more authorization requirements associated with the one or more masked data artifacts; and
implement the one or more data deobfuscation algorithms on the one or more masked data artifacts based on at least determining that the authentication level of the user meets the one or more authorization requirements associated with the one or more masked data artifacts.

13. The computer program product of claim 8, wherein the code further causes the first apparatus to:
transmit control signals configured to cause the computing device of the user to display the one or more data artifacts in response to unmasking the one or more masked data artifacts.

14. The computer program product of claim 8, wherein the code further causes the first apparatus to:
append the one or more placeholder indicators to the one or more masked data artifacts identifying the one or more data obfuscation algorithms used to mask the one or more data artifacts.

15. A method for identification of obfuscated electronic data through placeholder indicators, the method comprising:
electronically receiving, from a computing device of a user, a request to obfuscate one or more data artifacts stored on a first database;
determining one or more data types associated with the one or more data artifacts, wherein the one or more data types are associated with one or more exposure levels;
retrieving, from a data obfuscation repository, one or more data obfuscation algorithms based on at least the one or more exposure levels, wherein the one or more obfuscation algorithms is associated with one or more computational complexity;
determining that the one or more computational complexity of the one or more obfuscation algorithms does not meet one or more computational complexity requirements of the one or more data artifacts;
determining a number of iterations of implementation required for each of the one or more data obfuscation algorithms such that the one or more computational complexity of the one or more data obfuscation algorithms meets the one or more computational complexity requirements of the one or more data artifacts to generate one or more masked data artifacts;
iteratively implementing the one or more data obfuscation algorithms on the one or more data artifacts according to the number of iterations of implementation to obfuscate the one or more data artifacts and generate the one or more masked data artifacts;
generating one or more placeholder indicators identifying the one or more data obfuscation algorithms implemented on the one or more data artifacts, wherein the one or more placeholder indicators a pointer that associates each placeholder indicator with a corresponding data artifact;
creating one or more data fields corresponding to the one or more masked data artifacts on the first database;
formatting the one or more placeholder indicators to resemble the one or more data artifacts such that an unauthorized user who gains access to the first database is unable to distinguish between the one or more data artifacts and the one or more placeholders;
storing the one or more placeholder indicators in the one or more data fields, wherein storing further comprises appending the one or more placeholder indicators to the one or more masked data artifacts;
updating the first database with the one or more masked data artifacts and the one or more placeholder indicators; and
electronically receiving, from the computing device of the user, a request to access the first database; and
initiating a data deobfuscation engine on the first database in response to receiving the request, wherein initiating further comprises:
identifying one or more data deobfuscation algorithms corresponding to the one or more placeholder indicators;
identifying the one or more masked data artifacts corresponding to the one or more placeholder indicators;
implementing the one or more data deobfuscation algorithms on the one or more masked data artifacts corresponding to the one or more placeholder indicators; and
unmasking the one or more masked data artifacts based on at least implementing the one or more data deobfuscation algorithms.

16. The method of claim 15, wherein the method further comprises:
electronically receiving, from the computing device of the user, a request to access the first database;
transmitting control signals configured to cause the computing device associated with the user, an authentication request in response to receiving the request to access the first database;
receiving, from the computing device of the user, an authentication response in response to the authentication request;
validating the authentication response received from the user; and
authorizing the user to access the first database based on at least validating the authentication response.

17. The method of claim 16, wherein the method further comprises:
receiving, from the computing device of the user, the authentication response in response to the authentication request, wherein the authentication response comprises one or more authentication credentials associated with the user.

18. The method of claim 17, wherein the method further comprises:
scanning the first database for one or more instances of placeholder indicators;
identifying the one or more placeholder indicators based on at least scanning the first database; and
determining that the one or more data artifacts in the first database are masked based on at least identifying the one or more placeholder indicators.

* * * * *